June 3, 1930. T. S. MERRYLEES 1,761,087
WATER COOLER
Filed Jan. 7, 1929
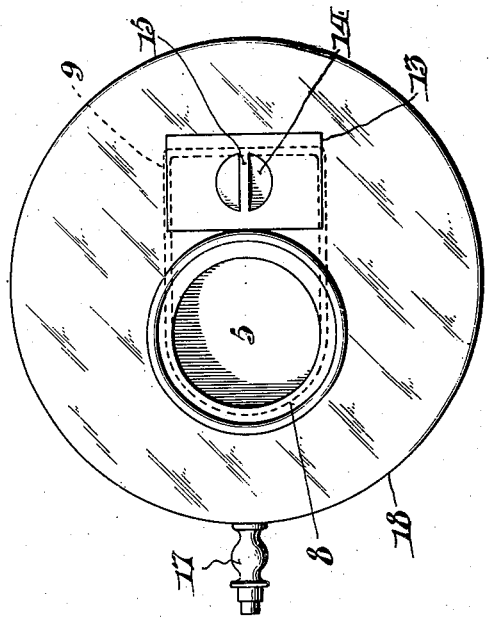
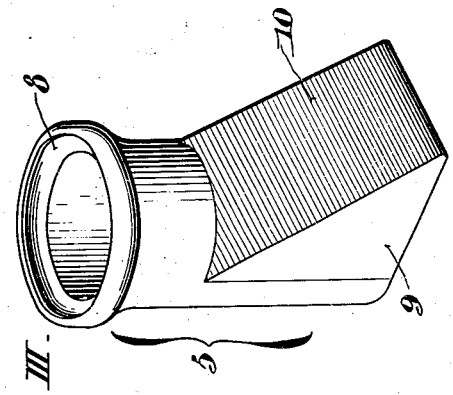
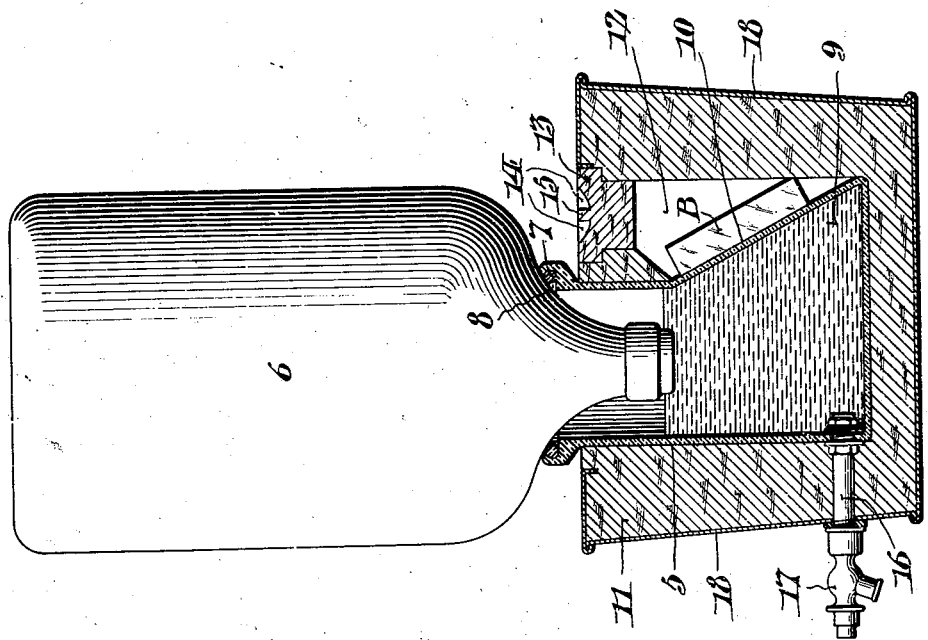
WITNESSES
INVENTOR:
Thomas S. Merrylees,
BY
ATTORNEYS.

Patented June 3, 1930

1,761,087

UNITED STATES PATENT OFFICE

THOMAS S. MERRYLEES, OF YEADON, PENNSYLVANIA

WATER COOLER

Application filed January 7, 1929. Serial No. 330,863.

This invention relates to water coolers, and particularly to invert bottle or "fountain" coolers designed for employment of solid carbon dioxide or the like as a refrigerant. More specifically speaking, this invention is concerned with coolers of the type featured in a copending patent application Ser. No. 293,182 filed by me on July 16, 1928, wherein the chilling effect of solid carbon dioxide in block form is communicated through the wall of a ceramic cooling receptacle or jar containing the water available for immediate consumption, and wherein spring devices are relied upon to compensate for sublimation of the refrigerant by maintaining it at all times in effective surface contact with said receptacle or jar.

The objects of the present invention are to provide for maintenance of surface contact as between the refrigerant and the water cooling receptacle without necessitating employment of additional or auxiliary means such as above referred to, and in general to secure the advantages of simplified construction and arrangement in the manufacture of water coolers adapted to the use of powerful refrigerants like solid carbon dioxide.

In the drawings, Fig. I shows a vertical sectional view of a water cooler conveniently embodying my invention.

Fig. II is a plan view of the same with the water supply bottle removed; and

Fig. III is a perspective view of the receptacle or jar in which the water is cooled.

With more detailed reference to these illustrations, the numeral 5 comprehensively designates the cooling receptacle or jar which receives the water, or other liquid to be cooled, from the supply bottle 6, said jar being constructed preferably from ceramic material like porcelain, for example. As shown, the bottle 6 is inverted after the customary manner with its mouth sealed by the liquid in the receptacle 5, and moreover supported as usual by a gasket 7 seated in an internal annular recess 8 around the top of said receptacle. From Figs. II and III it will be observed that the cooling receptacle 5 is generally cylindric and formed with a triangular or wedge-shaped lateral offset 9 having a sloping wall 10 at the rear.

For protection against external atmospheric influence, the receptacle 5 is embedded in a jacket 11 of heavy insulation, so as to be completely surrounded except for slight protrusion of its open top and for provision of a hollow 12 to accommodate a commercial size brick or block B of solid carbon dioxide or the like in repose against or closely hug the sloping wall 10 of the triangular offset 9, as shown in Fig. I. With this arrangement, the block B is obviously maintained, under the influence of gravity, in surface contact with the wall 10 throughout the period of sublimation so that the chilling effect of the refrigerant B is effectively and efficiently communicated to the water within the receptacle 5 without the assistance of auxiliary means. The hollow 12 is accessible for filling from above, and is ordinarily protected by a closure in the form of a removable insulate plug 13 which is recessed as at 14 (Fig. II) and, incidentally, provided with a finger grasp 15.

The receptacle 5 is drained through a short pipe connection 16 at the bottom, said connection leading through the insulation 11 to the exterior where it is fitted with a faucet 17. If desired, the cooler may be provided with a casing 18 of metal or wood to improve its appearance and thereby safeguard the insulation 11 against injury from impacts.

In addition to the advantages already pointed out, it is possible, through my invention, to convert ordinary pack ice water coolers to the use of solid carbon dioxide merely by substituting a cooling receptacle such as herein featured for the usual water jar, and filling in the space originally provided for the pack ice with insulation—reserving of course, a small opening like the hollow 12 for the commercial block of the new refrigerant. The procedure is thought to be obvious in view of the disclosure in still another patent application Ser. No. 298,675, filed by me on August 10, 1928, a detailed showing having therefore been omitted in the present instance.

Having thus described my invention, I claim:—

1. In a liquid cooler of the character described, a cooling receptacle having a sloping wall, and a jacket of thermo-insulation snugly surrounding said receptacle while affording a cavity to accommodate a unit block of solid carbon dioxide, said unit block resting under the influence of gravity against the sloping wall of the receptacle and being maintained in effective surface contact therewith by the aid of a coactive wall of the cavity throughout the entire period of sublimation.

2. In a water cooler of the character described, a water cooling receptacle with a lateral offset having a sloping wall, and a jacket of thermo-insulation snugly fitting the receptacle and affording a cavity to accommodate a unit block of solid carbon dioxide, said unit block resting under the influence of gravity against the sloping wall of the receptacle and being maintained in effective surface contact therewith by the aid of a coactive opposed wall of the cavity aforesaid throughout the entire period of sublimation.

3. In a cooler of the character described, a cooling receptacle embodying a wedge-shaped offset affording an inclined wall, and a jacket of thermo-insulation surrounding such receptacle with a counter wedge-shaped cavity opposing the inclined wall to accommodate a unit block of carbon dioxide, said block hugging the inclined wall on one of its major faces and being retained in effective gravitational surface contact therewith through the aid of one of its lateral edges engaging a coactive wall of the cavity aforesaid.

In testimony whereof, I have hereunto signed my name at Philadelphia, Pennsylvania, this 31st day of December, 1928.

THOMAS S. MERRYLEES.